(12) United States Patent
Hoffmann

(10) Patent No.: US 10,704,531 B2
(45) Date of Patent: Jul. 7, 2020

(54) WIND TURBINE ROTOR BLADE WITH A ROTOR BLADE CONNECTION AND METHOD FOR PRODUCING SAME

(71) Applicant: WOBBEN PROPERTIES GMBH, Aurich (DE)

(72) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 677 days.

(21) Appl. No.: 15/127,376

(22) PCT Filed: Mar. 20, 2015

(86) PCT No.: PCT/EP2015/055925
§ 371 (c)(1),
(2) Date: Sep. 19, 2016

(87) PCT Pub. No.: WO2015/140295
PCT Pub. Date: Sep. 24, 2015

(65) Prior Publication Data
US 2017/0138342 A1 May 18, 2017

(30) Foreign Application Priority Data
Mar. 20, 2014 (DE) .................. 10 2014 205 195

(51) Int. Cl.
*F03D 1/06* (2006.01)
*F03D 13/10* (2016.01)

(52) U.S. Cl.
CPC ......... *F03D 1/0691* (2013.01); *F03D 1/0658* (2013.01); *F03D 1/0675* (2013.01); *F03D 13/10* (2016.05); *F05B 2240/221* (2013.01); *F05B 2260/301* (2013.01); *F05B 2280/10* (2013.01); *F05B 2280/6003* (2013.01); *F05B 2280/702* (2013.01); *Y02E 10/721* (2013.01)

(58) Field of Classification Search
CPC ............................ F03D 1/0658; F03D 1/0691
See application file for complete search history.

(56) References Cited

U.S. PATENT DOCUMENTS 4,260,332 A 4/1981 Weingart et al.
6,371,730 B1 4/2002 Wobben
6,799,947 B2 * 10/2004 Wobben ............... F03D 1/0658
416/174

(Continued)

FOREIGN PATENT DOCUMENTS

DE 19733372 C1 1/1999
DE 10324166 A1 12/2004

(Continued)

*Primary Examiner* — Christopher Verdier
*Assistant Examiner* — Jason A Fountain
(74) *Attorney, Agent, or Firm* — Seed Intellectual Property Law Group LLP

(57) ABSTRACT

A wind turbine rotor blade with a rotor blade tip, a rotor blade root, and a rotor blade connection in the region of the rotor blade root with a rotationally symmetrical flange coupling is provided which has a first and a second end. The first end of the flange coupling has multiple bores for receiving fastening means for fastening to a hub of a wind turbine. The second end is fastened in or on material of the rotor blade root. The second end extends in the direction of an axis of rotation of the flange coupling.

15 Claims, 15 Drawing Sheets

(56) References Cited

U.S. PATENT DOCUMENTS

| | | | |
|---|---|---|---|
| 7,722,328 B2 | 5/2010 | Wobben | |
| 8,133,029 B2 | 3/2012 | Quell et al. | |
| 8,172,538 B2 * | 5/2012 | Hancock | F03D 1/0658 264/101 |
| 2003/0147751 A1 * | 8/2003 | Wobben | F03D 1/0658 416/174 |
| 2008/0206059 A1 * | 8/2008 | Hancock | F03D 1/0658 416/213 R |
| 2008/0240922 A1 * | 10/2008 | Eusterbarkey | F03D 15/10 416/204 R |
| 2011/0318186 A1 | 12/2011 | Kristensen et al. | |
| 2012/0045339 A1 | 2/2012 | Fleming et al. | |
| 2013/0108464 A1 | 5/2013 | McEwen et al. | |
| 2013/0122325 A1 * | 5/2013 | Park | C22C 37/04 428/639 |

FOREIGN PATENT DOCUMENTS

| | | | |
|---|---|---|---|
| DE | 112010003218 T6 | 7/2012 | |
| DE | 102006022272 C5 | 7/2013 | |
| EP | 2400147 A1 | 12/2011 | |
| EP | 2623771 A1 | 8/2013 | |
| FR | 2863321 A1 | 6/2005 | |
| WO | 2006070171 A1 | 7/2006 | |
| WO | 2010067082 A2 | 6/2010 | |

\* cited by examiner

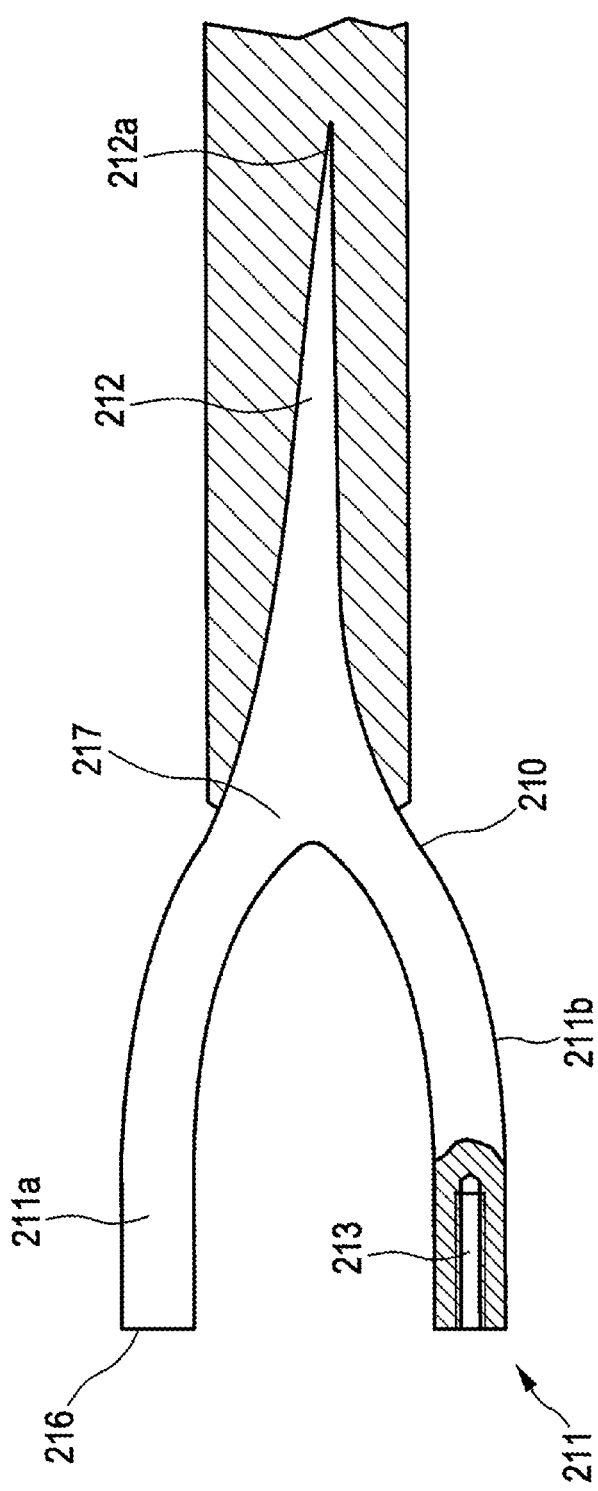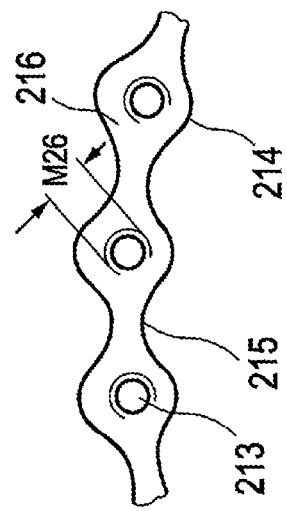
FIG. 6A
FIG. 6B

WIND TURBINE ROTOR BLADE WITH A ROTOR BLADE CONNECTION AND METHOD FOR PRODUCING SAME

BACKGROUND

Technical Field

The present disclosure relates to a wind turbine rotor blade, to a wind turbine rotor blade connection and to a wind turbine.

Description of the Related Art

Rotor blades of a wind turbine have a rotor blade connection via which the rotor blade can be fastened to a hub of a wind turbine. The rotor blade connection thus represents the interface of the rotor blade with the remainder of the wind turbine. The rotor blade connection thus has to be able to absorb all of the forces and torque which act on the rotor blade during operation and to direct them to the remainder of the wind turbine. The rotor blade connection must moreover be suitable for enabling the rotor blades to be adjusted (pitch adjustment).

DE 197 33 372 C2 describes a rotor blade of a wind turbine and a rotor blade connection. The rotor blade connection is provided in the region of the rotor blade root and has transverse bolts transverse to the longitudinal direction of the rotor blade. These transverse bolts are arranged in recesses provided transverse to the longitudinal axis of the rotor blade. The rotor blade can then be fastened to a hub of the wind turbine, for example by means of screws, the screws projecting into the transverse bolts and being fastened to the latter. A metal flange can be screwed to the root-side end of the rotor blade, the screws engaging in the transverse bolts. The rotor blade is then fastened to a hub of the wind turbine by means of the metal flange.

DE 103 24 166 A1 shows a rotor blade of a wind turbine with through holes in the rotor blade root region which extend transverse to the longitudinal axis. Transverse bolts can be inserted into these holes. The rotor blade can then be fastened to the transverse bolts via screws which extend outside the rotor blade root. Bores must be provided in the region close to the rotor blade root in order to receive the transverse and longitudinal bolts. However, such bores can result in a weakening of the rotor blade root.

In the German patent application establishing priority, a search made by the German Patent and Trademark Office found the following documents: DE 19733372 C1, DE 102006022272, DE 10324166 A1 and DE 112010003218 T5.

BRIEF SUMMARY

The present disclosure provides a wind turbine rotor blade and a wind turbine rotor blade connection which allow an improved fastening of the rotor blade to the remainder of the wind turbine.

A wind turbine rotor blade with a rotor blade tip, a rotor blade root and a rotor blade connection in the region of the rotor blade root with a rotationally symmetrical flange coupling which has a first and a second end is thus provided. The first end of the flange coupling has multiple bores for receiving fastening means for fastening to a hub of a wind turbine. The second end is fastened in or on a material of the rotor blade root, for example a fiber-reinforced composite (FRC). The second end extends in the direction of an axis of rotation of the flange coupling. The fiber-reinforced composite is optionally wound around the second end.

According to an aspect of the present disclosure, the second end has multiple tongues or projections, extending in the direction of the axis of rotation of the flange coupling, which are fastened in or on a material of the rotor blade. A positive-locking fit or adhesive bond between the flange coupling and the material of the rotor blade can be provided via the tongues or projections.

According to another aspect of the present disclosure, the first end of the flange coupling has two arms which each have a front side and multiple bores in the front side. A considerable amount of material can be saved in the region of the first end by providing the two arms on the first end.

According to another aspect of the present disclosure, the first end has a first section in the region of the bores and a second section between the bores. The width of the second section is smaller than the width of the first section. Recesses are provided on at least one side of the arms in the region of the first section. Further material can thus be saved, which results in a reduction in the weight of the flange coupling.

According to another aspect of the present disclosure, the cross-section of the flange coupling has an essentially Y-shaped design.

According to another aspect of the present disclosure, the tongues or projections of the second end of the flange coupling have at least one insert and/or one profile on at least one side, wherein the profile can take the form of a screw thread, a trapezoidal thread or a buttress thread.

According to another aspect of the present disclosure, the second end of the flange coupling is enveloped in the material of the rotor blade root.

According to another aspect of the present disclosure, the tongues or projections of the second end of the flange coupling can have a straight or undulating design.

According to another aspect of the present disclosure, the flange coupling is made from a metal and is in particular cast, for example in a nodular graphite casting process.

The disclosure hereby also relates to a wind turbine rotor blade connection with a rotationally symmetrical flange coupling which has a first and a second end, wherein the second end has multiple bores for receiving fastening means for fastening to a hub of a wind turbine. The second end extends in the direction of an axis of rotation of the flange coupling and is to be fastened in or on a material of the rotor blade.

The disclosure relates to the concept of providing a flange coupling (for example, made from metal) as a component of the rotor blade connection. The remainder of the rotor blade can then be fastened to the flange coupling. The flange coupling can be made, for example, from metal, whilst the rotor blade can be produced from a composite material (for example, fiberglass-reinforced plastic or carbon fiber-reinforced plastic). The flange coupling can have bores at one end so that the rotor blade can be fastened by means of the flange coupling to a hub of the wind turbine, for example by means of screws. The bores can be designed as blind holes or as through bores. If the bore is designed as a blind hole, an internal screw thread can optionally be provided. The other end of the flange coupling is fastened to the rotor blade.

Because the blind holes or through holes are provided in the metal flange coupling, the flange coupling and the rotor blade fastened to it can be fastened to the hub of the wind turbine and dismounted from it in a simple fashion. The provision of the metal flange coupling as part of the rotor blade connection is advantageous because thus neither longitudinal nor transverse bores need to be provided in the region close to the blade root. This results in a considerable saving in time when producing wind turbine rotor blades. According to another aspect of the present disclosure, the metal flange coupling can be enveloped.

According to the disclosure, the rotor blade connection has a flange coupling with a T-shaped or Y-shaped cross-section.

The flange coupling optionally has a rotationally symmetrical design.

The rotor blade connection has multiple blind holes or through bores at its first end. The first end of the rotor blade connection is, for example, screwed to a hub of the wind turbine. A second end of the rotor blade connection is fastened or integrated in the region of the rotor blade close to the rotor blade root. The second end of the rotor blade connection can have multiple tongues. The tongues can, for example, be droplet-shaped or spoon-shaped. By virtue of the droplet shape or spoon shape of the tongues and by virtue of the tongues themselves, a positive-locking fit can be enabled between the rotor blade connection and the region of the rotor blade close to the rotor blade root.

The purpose of the rotor blade connection is, on the one hand, to connect the rotor blade to the hub but also to transfer the forces which act on the rotor blade into the hub. The connection between the rotor blade connection and the hub should be detachable in order to permit mounting, disassembly or repair.

According to the disclosure, a wind turbine rotor blade is provided with a rotor blade connection on the rotor blade root. The rotor blade connection has a coupling flange or a flange coupling which has a first and second end. Multiple bores are provided at the first end in order to receive fastening means. The first end has a front side which spans a first plane. Multiple tongues are provided at the second end. The tongues optionally extend perpendicularly to the first plane, which is spanned by the front side of the first end.

Other embodiments of the disclosure are the subject of the subclaims.

BRIEF DESCRIPTION OF THE SEVERAL VIEWS OF THE DRAWINGS

Advantages and exemplary embodiments of the disclosure are explained in detail below with reference to the drawings, in which:

FIG. 6A shows a schematic view in section of a flange coupling according to a fifth exemplary embodiment, FIG. 6B shows a schematic plan view of one end of a flange coupling from FIG. 6A.

DETAILED DESCRIPTION

Figure 1:
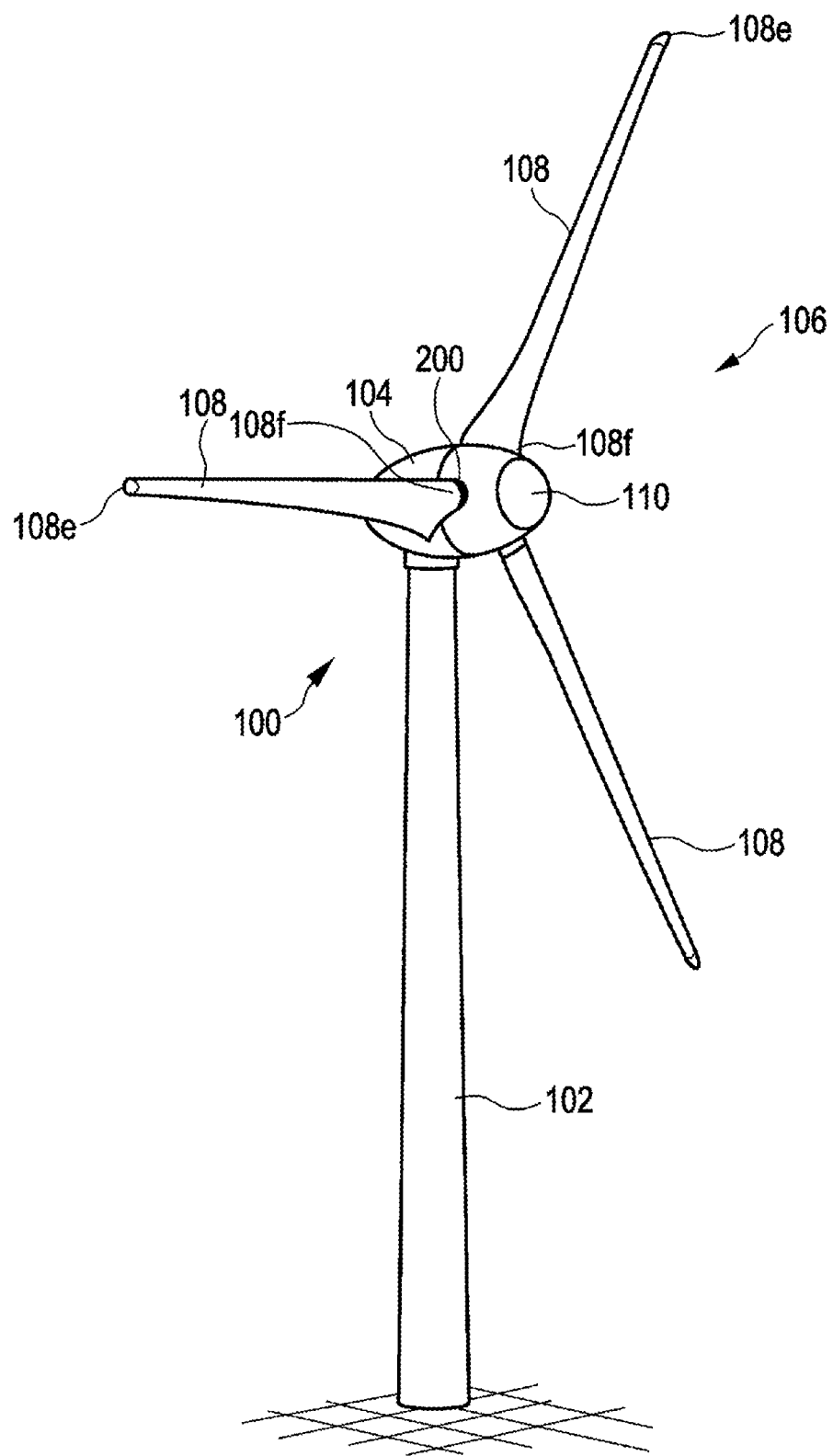
FIG. 1 shows a schematic view of a wind turbine according to the disclosure.

FIG. 1 shows a schematic view of a wind turbine according to the disclosure. The wind turbine 100 has a tower 102 and a nacelle 104. A rotor 106 with three rotor blades 108 and a spinner 110 is provided on the nacelle 104. The rotor blades 108 each have a rotor blade tip 108e and a rotor blade root 108f. The rotor blade 108 is fastened at the rotor blade root 108f to a hub of the rotor 106. During operation, the rotor 106 is set in rotational movement by the wind and thus also rotates a rotor of an electrical generator in the nacelle 104 directly or indirectly. The rotor blades 108 are connected via a rotor blade connection 200 to the rotor and in particular to a hub of the wind turbine. The pitch angle of the rotor blades 108 can be altered by pitch motors on the rotor blade roots or on the rotor blade connection 200 of the respective rotor blades 108.

Figure 2:
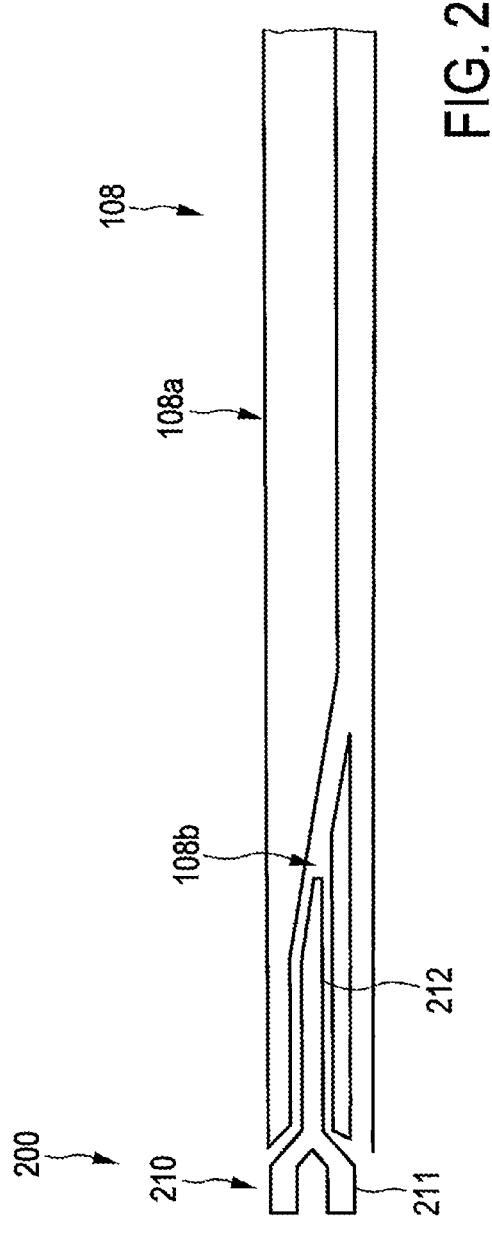
FIG. 2 shows a schematic view in section of a part of a rotor blade of a wind turbine according to the first exemplary embodiment.

The disclosure relates in particular to the design of the rotor blade connection, i.e., the end of the rotor blade which is fastened to a hub of the rotor. FIG. 2 shows a schematic cross-section of a rotor blade and in particular a cross-section of the rotor blade root region with the rotor blade connection 200. The rotor blade connection 200 has a flange coupling 210. The flange coupling 210 has a first end 211 and a second end 212. The first end 211 serves to fasten the rotor blade 108 directly or indirectly to a hub of a wind turbine. The second end 212 is integrated into the material of the rotor blade, which can be a fiber-reinforced composite such as glass-reinforced plastic (GRP) or carbon fiber-reinforced plastic CFRP. The fiber-reinforced composite can in particular be wound around the second end. The first end 212 can hereby be fastened between a first and second rotor blade material section 108a, 108b.

The flange coupling 210 is optionally made from metal, for example cast or produced in a nodular graphite casting process. Blind holes, which can receive screws 220 for fastening the rotor blade connection to the hub, can be provided on the first end 211.

Only a portion of the rotor blade or the rotor blade root with the rotor blade connection is shown in FIG. 2. The rotor blade connection and the rotor blade root typically have a rotationally symmetrical design.

Figure 3:
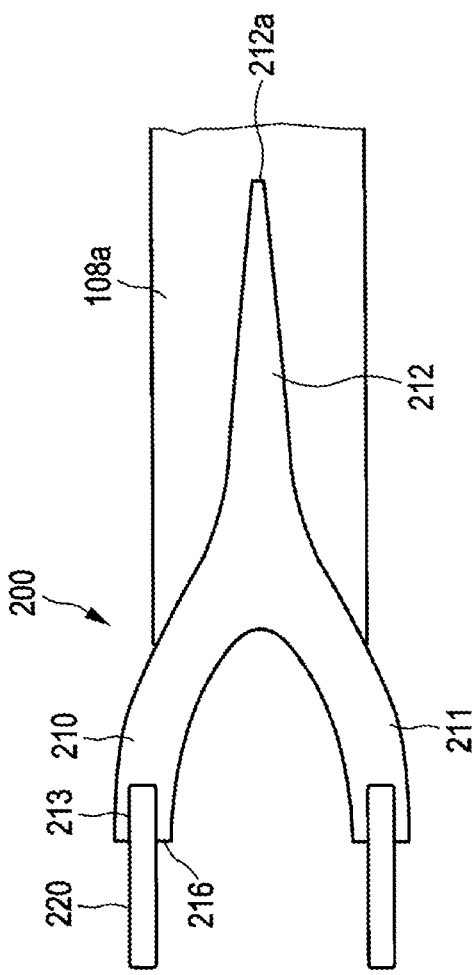
FIG. 3 shows a schematic view in section of a rotor blade connection for a rotor blade of a wind turbine according to a second exemplary embodiment.

FIG. 3 shows a schematic cross-section of a rotor blade connection of a rotor blade of a wind turbine according to a second exemplary embodiment. The rotor blade connection 200 has a flange coupling 210 which can have an essentially Y-shape in cross-section. The flange coupling 210 has a first end 211 and a second end 212. The first end 211 has two arms, each with a front side 216. Blind holes 213 are provided in the front side 216. The blind holes 213 can receive screws 220 which are used to fasten the rotor blade connection 200 and hence the rotor blade 108 to a hub of the wind turbine. The fastening can hereby be effected directly or indirectly. The second end 212 has a tip 212a and is integrated into material of the rotor blade, for example a composite material 108a.

Figure 4:
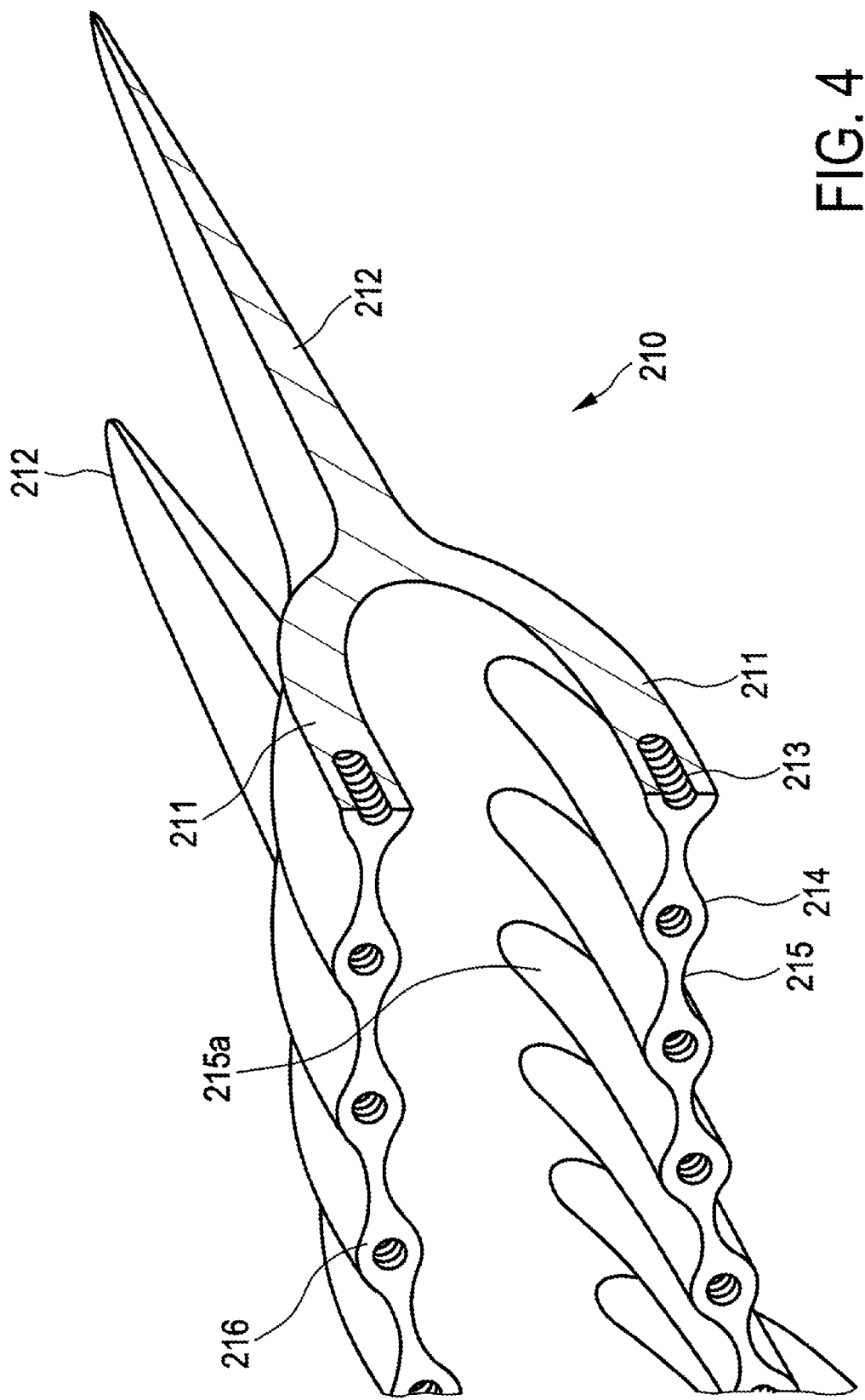
FIG. 4 shows a perspective view in section of a flange coupling of a rotor blade connection of a rotor blade according to a third exemplary embodiment.

FIG. 4 shows a perspective view in section of a flange coupling 210 of a rotor blade connection of a rotor blade of a wind turbine according to a third exemplary embodiment. As shown in the first or second exemplary embodiment, the flange coupling 210 according to the third exemplary embodiment can be fastened in or on the rotor blade material of the rotor blade. The flange coupling 210 according to the third exemplary embodiment has a first end 211 and a second end 212. The cross-section of the flange coupling 210 can be Y-shaped. The first end 211 has two arms 211 which each have a front side 216. Blind holes 213 can be provided in the two arms 211. The width of the front side 216 is greater in the region of the blind holes 213 than in the regions 215 between the blind holes 213. A minimal wall thickness can thus be provided at the regions 215. A saving in material can thus result from the design of the regions 215 between the blind holes which have a smaller width than the regions 240. The regions 215a can, as shown in FIG. 4, extend along both the inside and outside of the arms 211.

Figure 5:
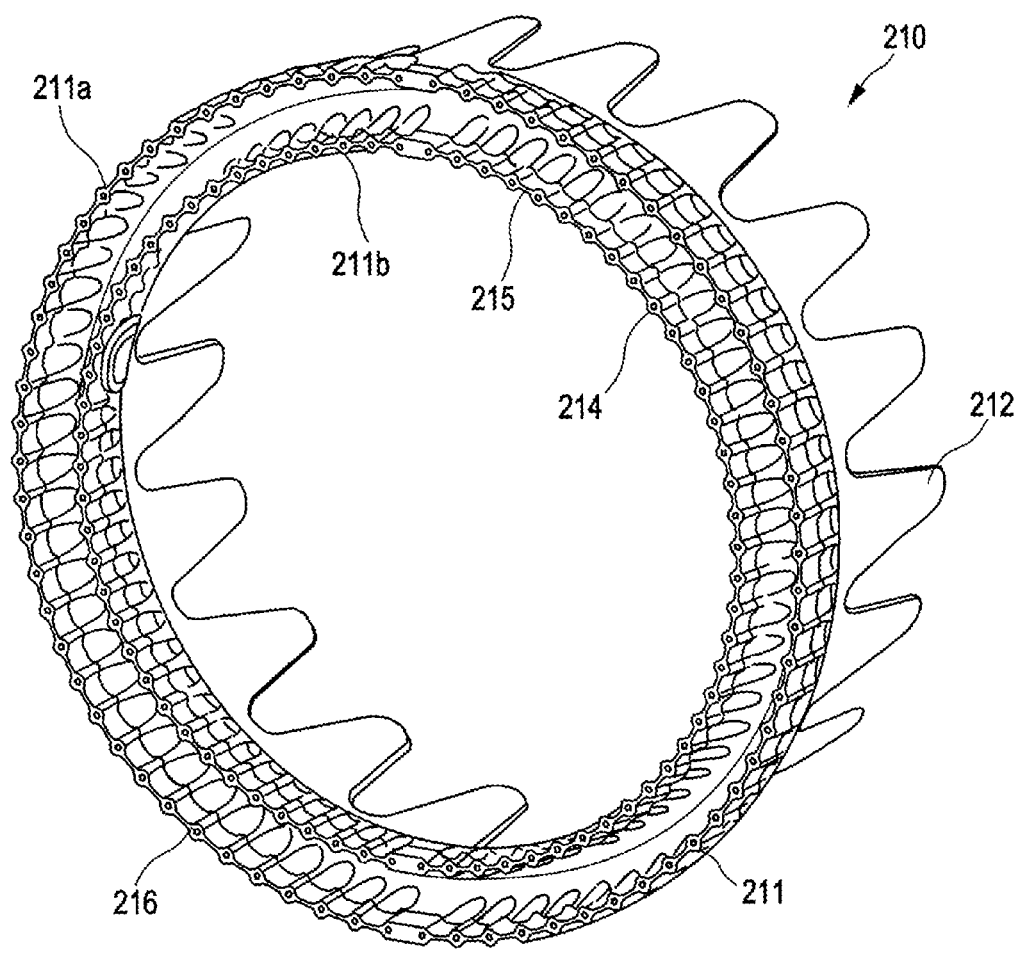
FIG. 5 shows a perspective view of a flange coupling of a rotor blade connection according to a fourth exemplary embodiment.

FIG. 5 shows a perspective view of a flange coupling according to the fourth exemplary embodiment. The flange coupling according to the fourth exemplary embodiment can correspond to the flange coupling according to the third exemplary embodiment. The flange coupling has a first end 211 with a front side 216 and a second end 212 with multiple tongues 212 which, for example, taper and have a rounded tip. The tongues 212 are fastened or integrated into or on material of the rotor blade. The first end 211 has, in cross-section, two arms 211a, 211b which each have a front side 216, multiple bores 213, multiple first sections 214 in the region of the bores 213, and multiple second sections 215 between the bores 213. The sections 215 have a smaller thickness than the sections 214. This serves to save material.

FIG. 6A shows a schematic view in section of a flange coupling of a rotor blade connection according to a fifth exemplary embodiment. The flange coupling 210 has a first end 211 and a second end 212. The first end 211 can have two arms 211a, 211b which each have a front side 216. Multiple blind bores or bores 213 can be provided in the front side 216. The two arms 211a, 211b are joined in a central section 217.

FIG. 6B shows a plan view of the front side of the flange coupling from FIG. 6A. Multiple bores 213 are provided in the front side. A first section 214 is provided in the region of the bores and a second section 215 is provided in the region between the bores. The width of the section 215 is smaller than the width of the section 214. A minimum material thickness can be ensured with the embodiment shown in FIG. 6B, whilst the weight of the flange coupling 210 is minimized as much as possible.

Figure 7:
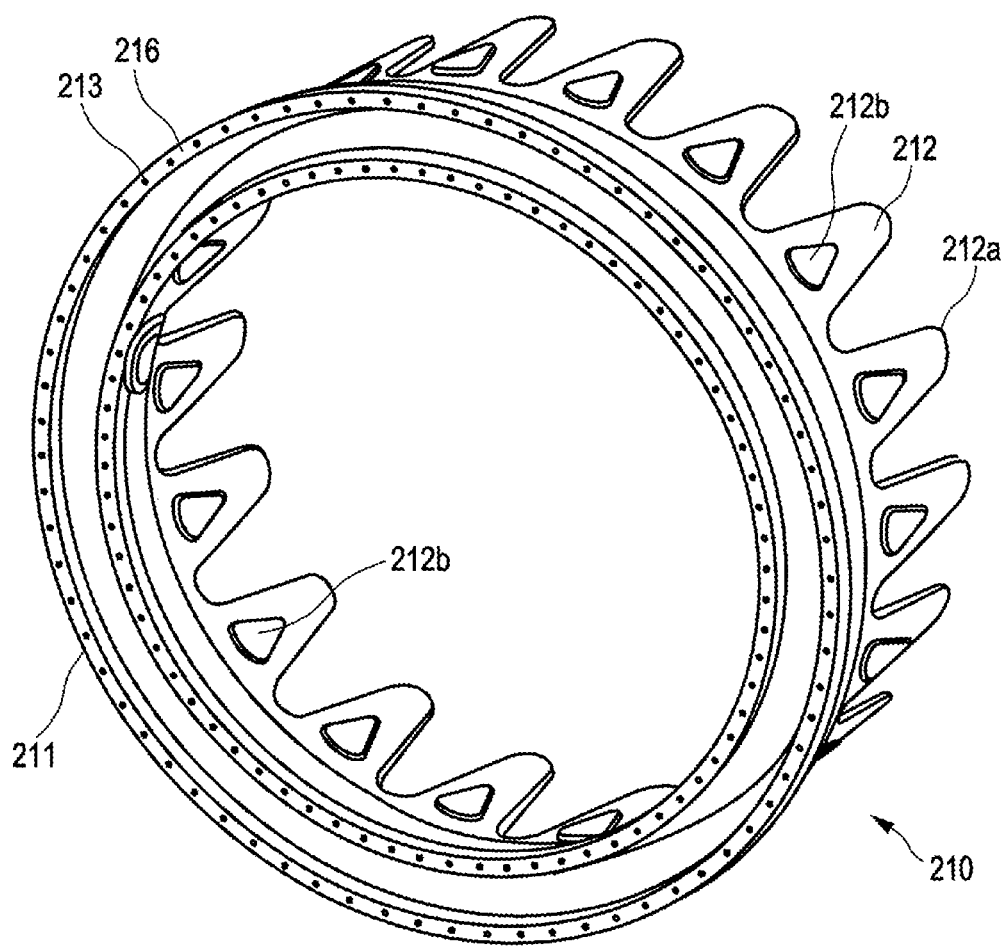
FIG. 7 shows a perspective view of a flange coupling of a rotor blade connection according to a sixth exemplary embodiment.

FIG. 7 shows a schematic perspective view of a flange coupling of a rotor blade connection of a rotor blade according to a sixth exemplary embodiment. The flange coupling has a first end 211 and a second end 212. The first end 211 has, in cross-section, two arms, each with a front side 216 and bores 213 in the front side. The second end 212 has multiple tongues 212 which can taper and have a rounded tip. An insert 212b can be provided on each of the tongues 212. The insert 212b can be provided on the inner and/or outer side. In contrast to the third, fourth and fifth exemplary embodiments, the width of the front side 216 according to the sixth exemplary embodiment is constant. Although this makes production simpler, the weight of the flange coupling 210 also increases in comparison to the third, fourth or fifth exemplary embodiment.

Figure 8:
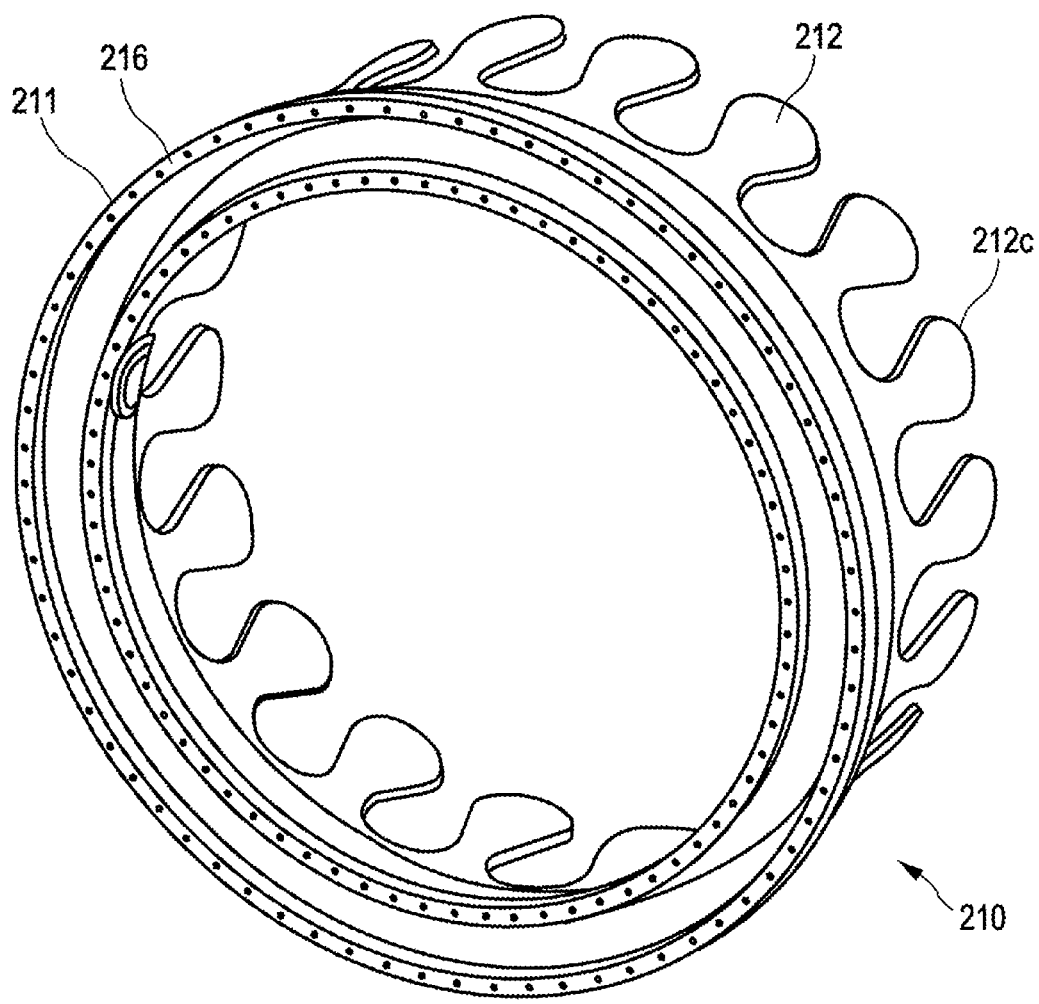
FIG. 8 shows a schematic perspective view of a flange coupling of a rotor blade connection according to a seventh exemplary embodiment.

FIG. 8 shows a schematic view of a coupling flange of a rotor blade connection of a rotor blade according to the seventh exemplary embodiment. The coupling flange has a first end 211 for coupling the rotor blade connection directly or indirectly to the hub of a wind turbine, and a second end 212 which is fastened in or on the material of the rotor blade. The second end 212 has multiple tongues 212c which have, for example, a spoon shape. The width of the tongues 212c initially increases. The tips of the tongues 212c have a rounded design. When precisely shaped complementary pieces of the rotor blade material (108a or 108b) are placed between the spoon-shaped tongues 212c, a positive-locking fit results between the coupling flange 200 and the material of the rotor blade 108.

Figure 9:
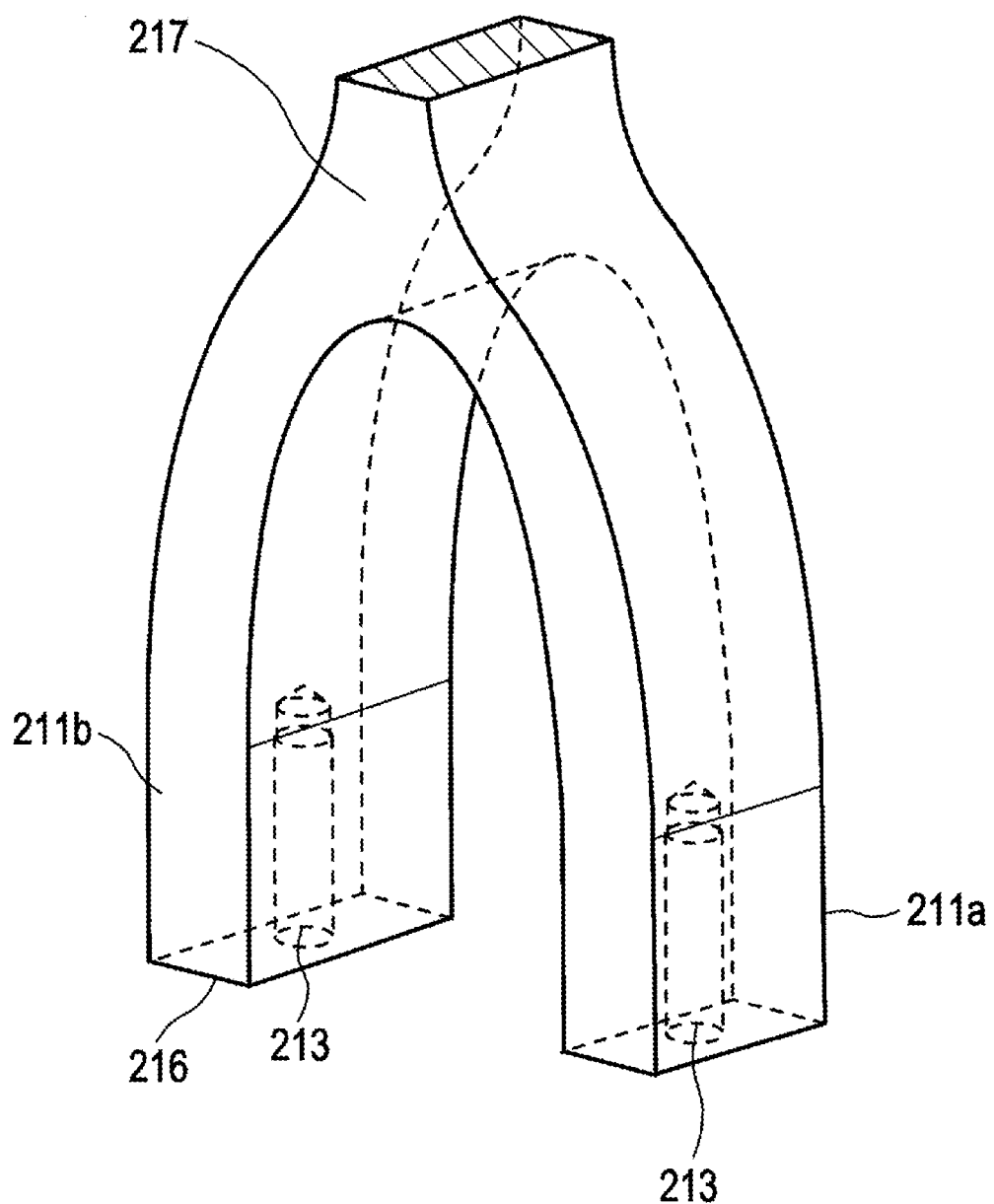
FIG. 9 shows a schematic view of one end of a flange coupling according to the eighth exemplary embodiment.

FIG. 9 shows a schematic view of a section of a flange coupling of a rotor blade connection of a rotor blade according to an eighth exemplary embodiment. The first end 211 of the flange coupling 210 is shown in particular in FIG. 9. The first end has, in cross-section, two arms 211a, 211b, each with a front side 216 and multiple bores 213 in the front side 216. The two arms 211a, 211b are joined in a central section 217.

Figure 10:
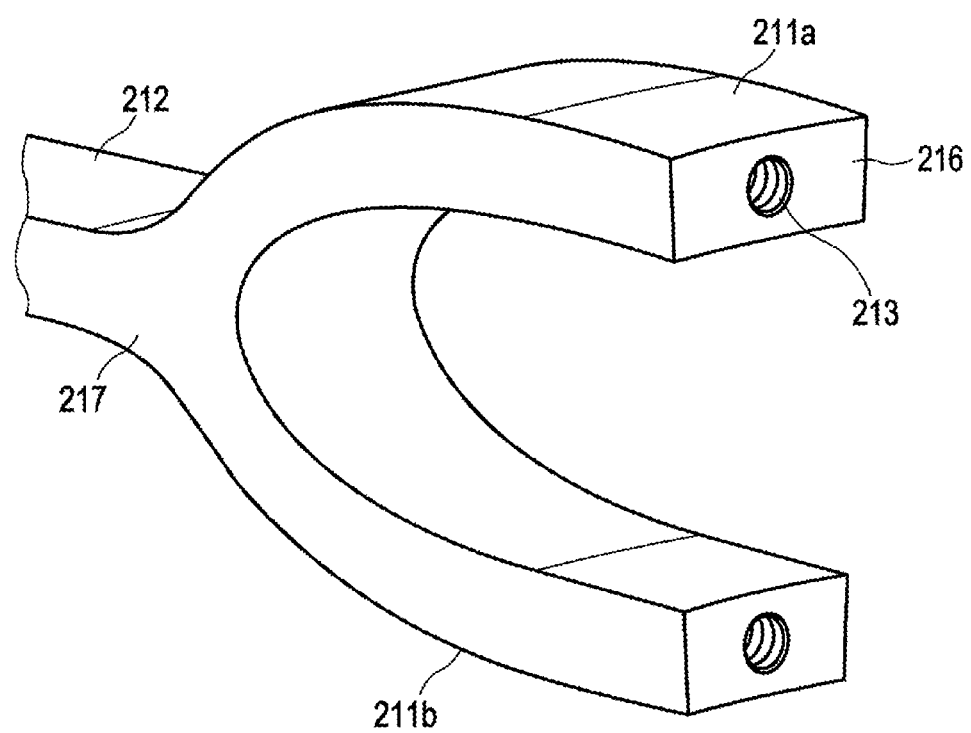
FIG. 10 shows a perspective view in section of a flange coupling of a rotor blade connection according to the ninth exemplary embodiment.

FIG. 10 shows a further schematic view of a portion of a flange coupling of a rotor blade connection of a rotor blade of a wind turbine according to a ninth exemplary embodiment. A portion of the flange coupling 210 is in particular shown in FIG. 10. The flange coupling 210 has a rotationally symmetrical design. The flange coupling has a first end 211, a central section 217, and a second end 212. The first end 211 has, in cross-section, two arms 211a, 211b, each with a front side 216 and multiple bores 213 in the front side.

Figure 11:
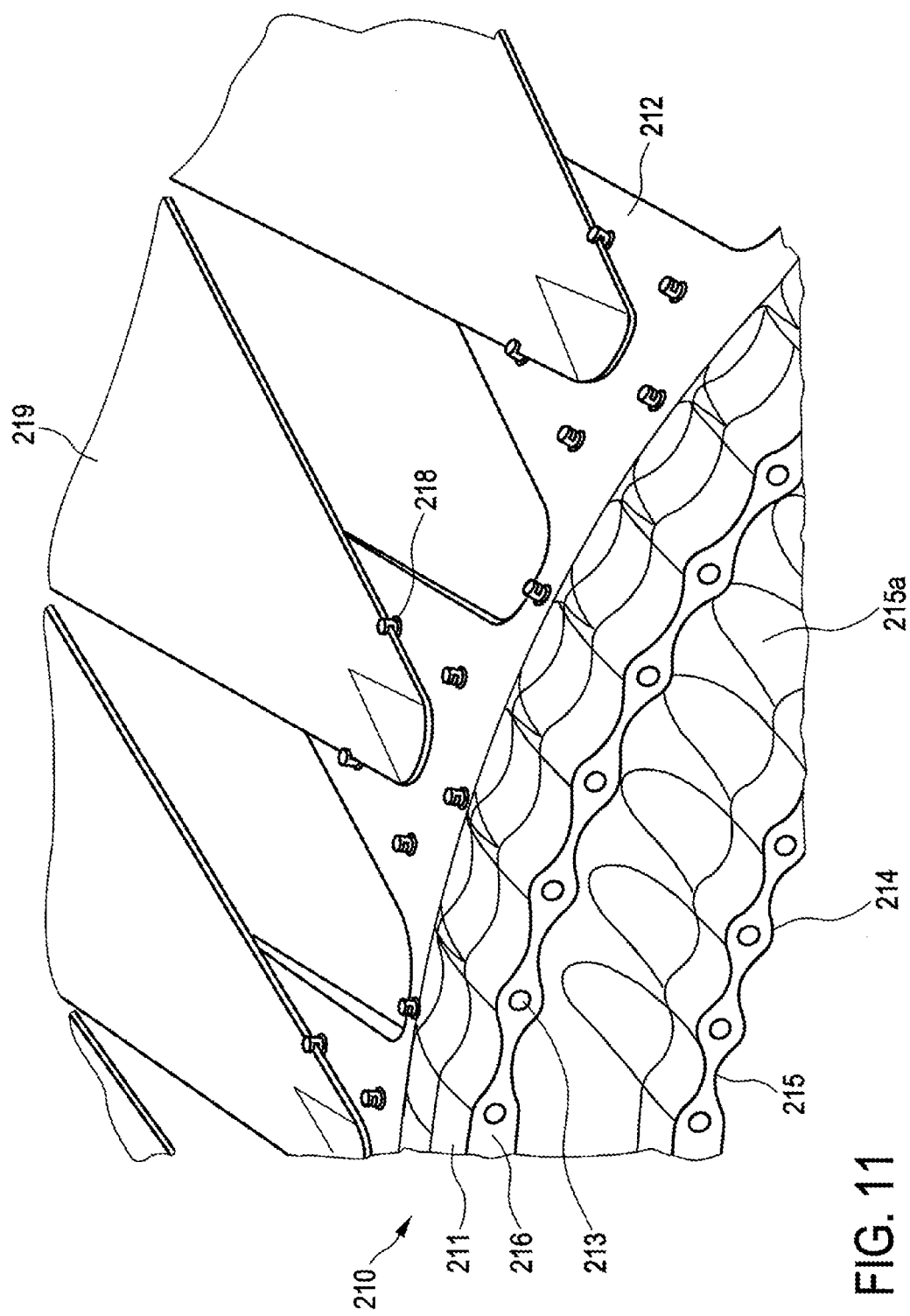
FIG. 11 shows a perspective view of a portion of a flange coupling of a rotor blade connection according to the tenth exemplary embodiment.

FIG. 11 shows a schematic perspective view of a portion of a flange coupling of a rotor blade connection of a rotor blade according to the tenth exemplary embodiment. The flange coupling 210 has a first end 211 and a second end 212. The first end 211 serves to fasten the rotor blade connection directly or indirectly to a hub of a wind turbine. The second end 212 is fastened in or on material of the rotor blade.

The first end 211 has, in cross-section, two arms 211, each with a front side 216 and multiple bores 213 in the front side 216. A first section 214 is provided in the region of the bores 213 and a second section 215 is provided in the region between the bores. The thickness of the second section 215 is smaller than the thickness of the first section 214. The second section 215 extends on the inner and/or outer side of the arms 211 and has respective recesses 215a. The different thicknesses in the first and second section 214, 215 ensure that a minimum material thickness is provided, whilst the weight of the flange coupling is optimized.

Multiple projections 218 are provided on the tongues 212 in the exemplary embodiment in FIG. 11. These projections 218 serve to retain an element 219. The element 219 takes the form of a GFRP plate which is intended to introduce the load into the rotor blade. A positive-locking fit between the flange and the material of the rotor blade is made possible by the design of the projections 218 and the plate 219. The GFRP plate 219 can optionally be an integral component of the rotor blade 108 or of the material of the rotor blade. The projections 218 are moreover provided in order to produce a positive-locking fit with the rotor blade material 108a.

Figure 12:
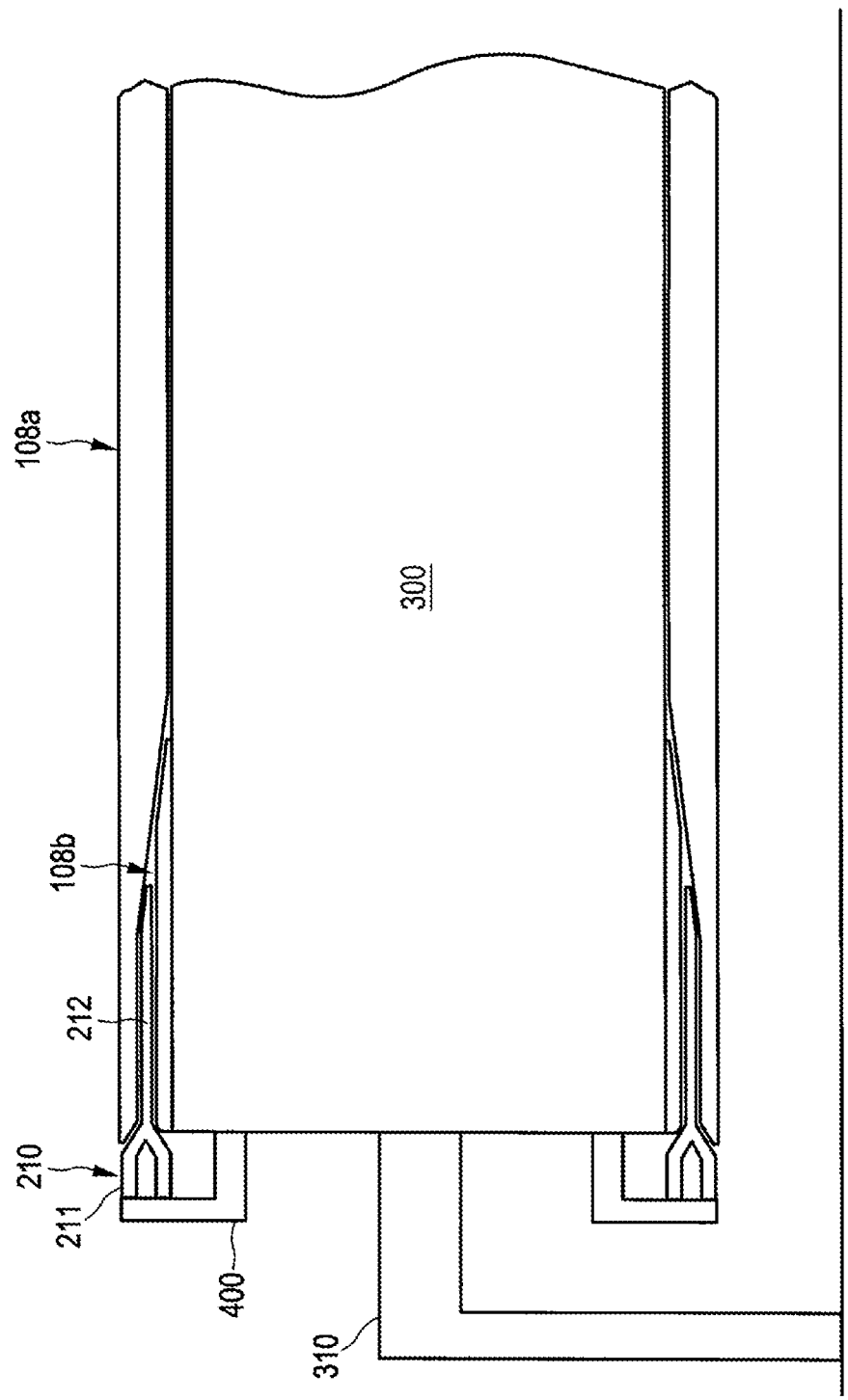
FIG. 12 shows a schematic view of the production of a rotor blade according to an eleventh exemplary embodiment.

FIG. 12 shows a schematic view during the production of a rotor blade according to an eleventh exemplary embodiment. A winding arm 300 is provided with a holder 310. A positioning system 400 is moreover provided. An infusion laminating section 108b can be provided on the winding core 300. The flange coupling 210, and in particular the second end 212 of the flange coupling 210, can be placed on this infusion laminating section 108b. The flange coupling 210 has a rotationally symmetrical design. According to the eleventh exemplary embodiment, the first end 212 of the rotor blade connection is enveloped in the rotor blade material.

The rotor blade connection according to the disclosure permits a significant reduction in the weight of the rotor blade root region of the rotor blade. Because the transverse bolts, and hence the transverse bores, and the longitudinal bores for the longitudinal bolts are absent, the rotor blade root region of the rotor blade can have a significantly thinner design.

According to the disclosure, a steel flange is provided as a coupling flange which is enveloped in the rotor blade material.

In the above exemplary embodiments, the first end 211 of the coupling flange 210 has two arms and the cross-section is essentially Y-shaped. The coupling flange can alternatively have a T-shaped cross-section.

According to the disclosure, the flange coupling 210 can take the form of a cast iron flange.

Figure 13:
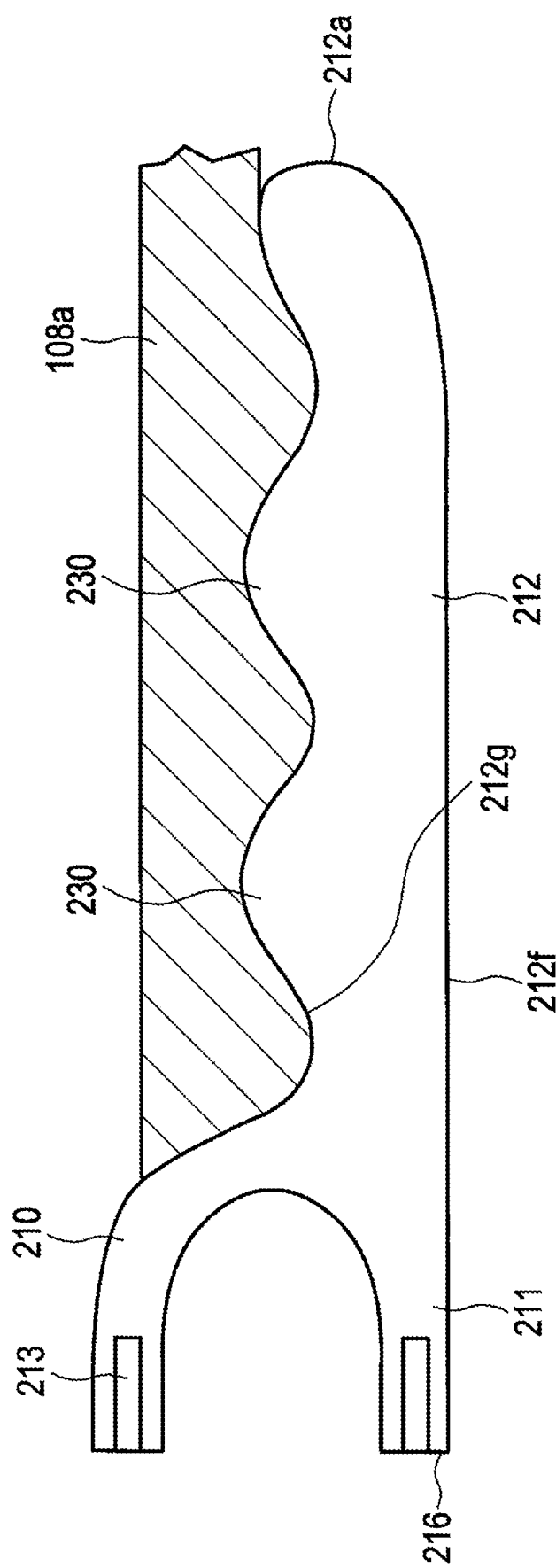
FIG. 13 shows a schematic view in section of a flange coupling according to a twelfth exemplary embodiment.
Figure 14:
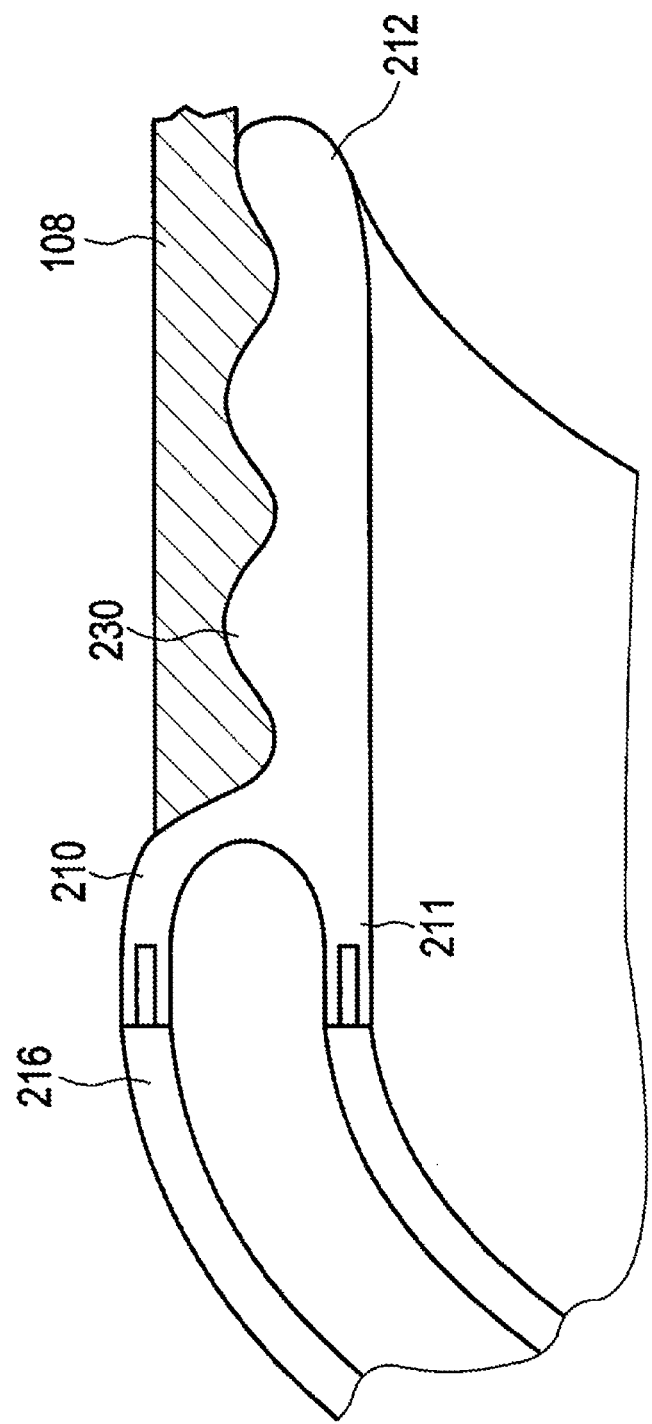
FIG. 14 shows a perspective view of a portion of a flange coupling according to the twelfth exemplary embodiment.

FIG. 13 shows a schematic view in section and FIG. 14 shows a perspective view of a portion of a flange coupling of a rotor blade connection according to a twelfth exemplary embodiment. The flange coupling 210 has a first end 211 and a second end 212. The first end 211 serves to fasten the rotor blade 108 directly or indirectly to a hub of a wind turbine. The second end 212 is integrated into the rotor blade material 108. The flange coupling 210 according to the twelfth exemplary embodiment takes the form of a completely rotationally symmetrical flange, i.e., the second end 212 does not have any plates or tongues either. A profile 230 is provided in the region of the second end 212 and in particular on the outer side of the second end. This profile 230 can optionally take the form of a screw thread, a trapezoidal thread and/or a buttress thread. The flange coupling 210 bears in particular on the outer side of the second end 212 against material 108 of the rotor blade. The material 108 can, for example, be applied according to the winding process described in the eleventh exemplary embodiment. A positive-locking fit is optionally achieved between the flange coupling 210 and the rotor blade material 108.

Optionally no rotor blade material 108 is provided on the inner side 212f. The material is provided only on the outer side 212g.

Figure 15:
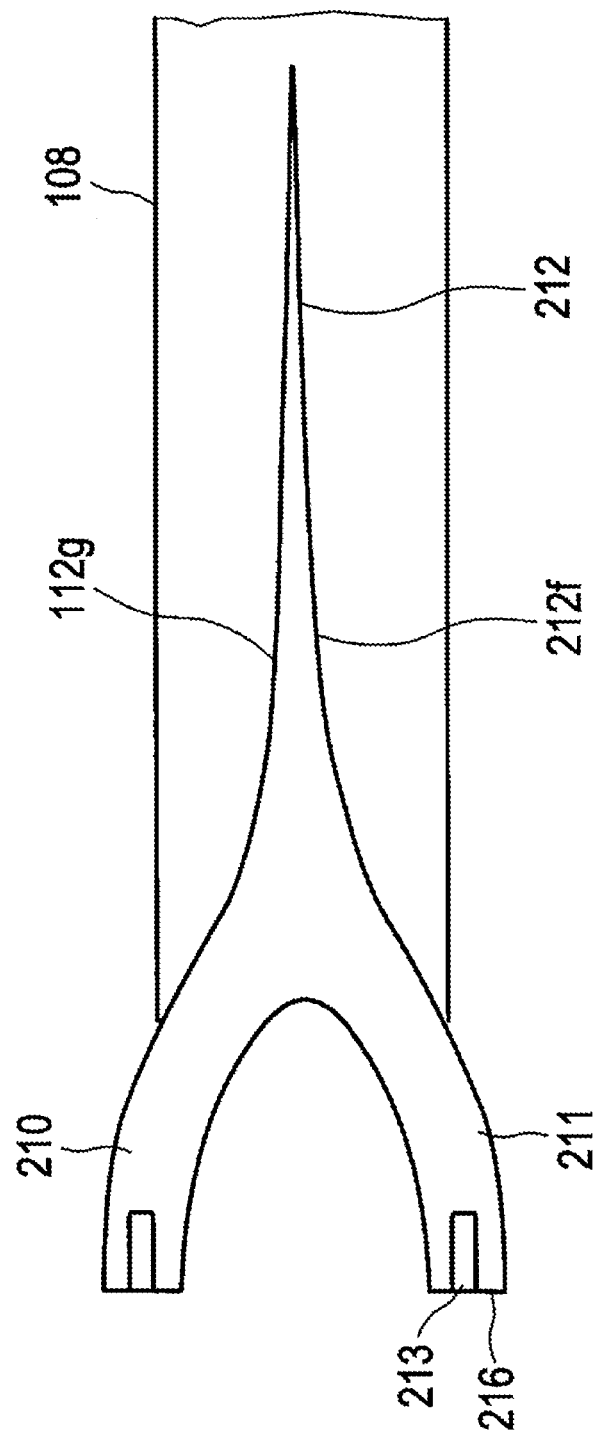
FIG. 15 shows a schematic view in section of a flange coupling of a rotor blade connection according to as thirteenth exemplary embodiment.
Figure 16:
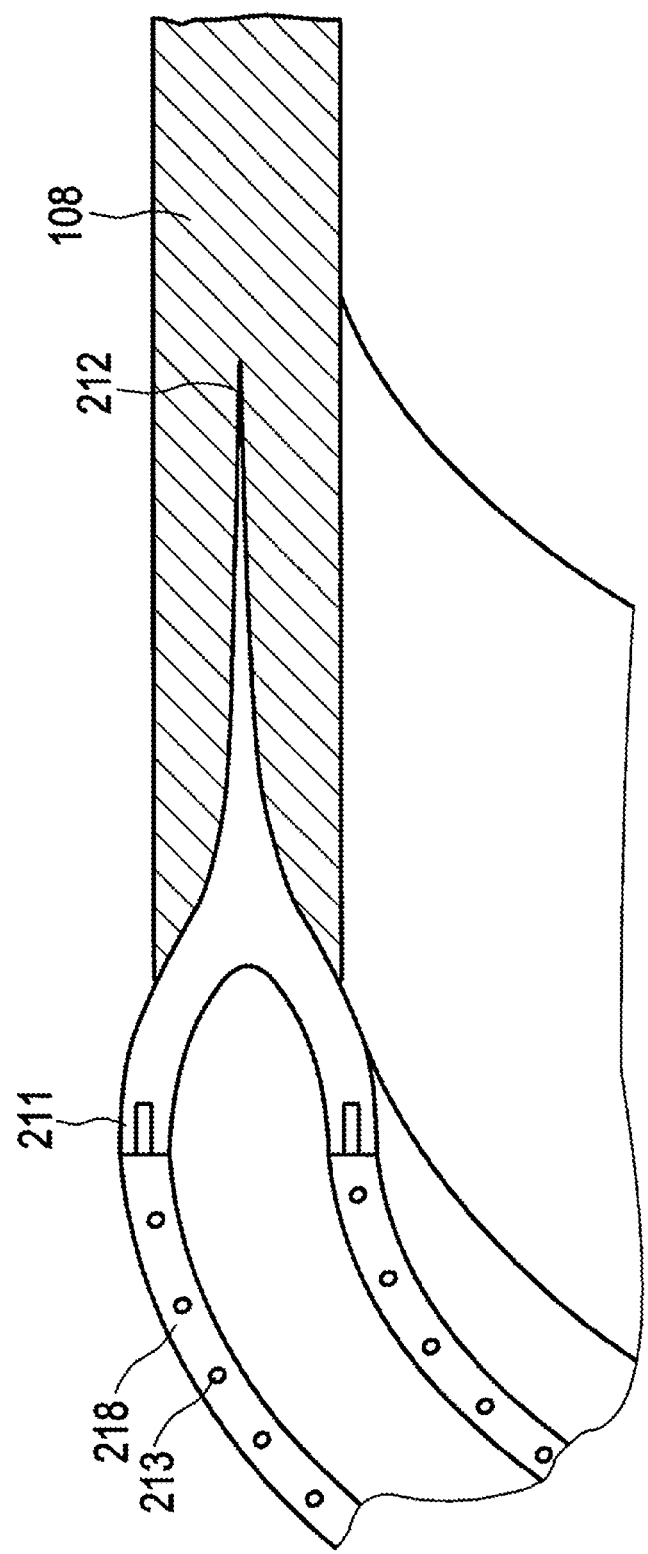
FIG. 16 shows a schematic view of a portion of a flange coupling of the rotor blade connection according to the thirteenth exemplary embodiment.

FIG. 15 shows a schematic view in section and FIG. 16 shows a perspective view of a portion of a flange coupling of a rotor blade connection according to a thirteenth exemplary embodiment. The flange coupling 210 has a first end 211 and a second end 212. A front side 216, which has bores 213 for receiving fastening means, is provided at the first end 211. The first end 211 serves for fastening to a hub of a wind turbine. The second end 212 serves to fasten the flange coupling in material 108a of the rotor blade 108. The flange coupling is optionally provided so that it is completely rotationally symmetrical, i.e., it has no plates or tongues. The second end 212 optionally has a tapered design and has material of the rotor blade on both its inner side 212f and its outer side 212g. An infusion laminate can be applied to the inner side 212f and the material can be applied to the outer side 212g by means of a winding process. According to the thirteenth exemplary embodiment, an adhesive bond is provided between the flange coupling 210 and the rotor blade 108.

According to the disclosure, a wind turbine rotor blade with a rotor blade connection is provided. The rotor blade connection has a flange coupling which has a first and second end. The first end has a front side with multiple bores, wherein the front side spans a first plane. Multiple tongues which optionally extend perpendicularly to the first plane are provided on the second end.

According to the disclosure, the flange coupling 110 can be produced in a nodular graphite casting process, i.e., casting using spheroidal graphite. Spheroidal graphite is hereby admixed with the iron. This has the advantage that the nodular graphite casting has a significantly higher viscosity than normal cast iron.

According to an aspect of the present disclosure, the second end 112 of the flange coupling 110 can be designed with no tongues or recesses.

According to an aspect of the present disclosure, the flange coupling can, for example, be cleaned by sandblasting after the casting process. The adhesive or bonding properties of the flange coupling during the winding process can thereby be improved.

The invention claimed is:

1. A wind turbine rotor blade comprising:
a rotor blade tip;
a rotor blade root; and
a rotationally symmetrical flange coupling having a first end and a second end, the flange coupling being a single piece of cast metal or a single piece of nodular graphite,
wherein the second end extends in a direction of an axis of rotation of the flange coupling and is fastened in or on a material of the rotor blade root, and
wherein the first end of the flange coupling has two arms, each of the two arms having a front side and a plurality of bores at the front side, wherein the plurality of bores are configured to receive fasteners to fasten the wind turbine rotor blade to the hub of the wind turbine,
wherein the flange coupling directly couples the wind turbine rotor blade to the hub of the wind turbine.

2. The wind turbine rotor blade according to claim 1, wherein:
the second end has a plurality of tongues or projections that extend in the direction of the axis of rotation of the flange coupling and are fastened in the material of the rotor blade root.

3. The wind turbine rotor blade according to claim 2, wherein:
the tongues or projections of the second end of the flange coupling have at least one insert on at least one side.

4. The wind turbine rotor blade according to claim 1, wherein:
the first end has first sections at regions of the plurality of bores and second sections between the plurality of bores, wherein widths of the second sections are smaller than widths of the first sections.

5. The wind turbine rotor blade according to claim 1, wherein:

a cross-section of the flange coupling is substantially Y-shaped.

6. The wind turbine rotor blade according to claim 2 wherein:
the tongues or projections of the second end of the flange coupling have at least one insert on at least one side.

7. The wind turbine rotor blade according to claim 2, wherein:
the tongues or projections of the second end of the flange coupling are spoon-shaped.

8. The wind turbine rotor blade according to claim 1, wherein:
the second end of the flange coupling is embedded in the material of the rotor blade root.

9. The wind turbine rotor blade according to claim 2, wherein:
the tongues or projections of the second end of the flange coupling have a straight or undulating shape.

10. The wind turbine rotor blade according to claim 1, wherein:
the second end of the flange coupling is embedded in the material of the rotor blade root.

11. The wind turbine rotor blade according to claim 1, wherein:
the flange coupling has, on an outer side of the second end, a profile of a screw thread, a trapezoidal thread, or a buttress thread.

12. The wind turbine rotor blade according to claim 11, wherein:
the material of the rotor blade root is wound on the outer side of the second end.

13. A wind turbine comprising:
a hub; and
at least one wind turbine rotor blade according to claim 1 coupled to the hub by the first end of the flange coupling.

14. A method for producing a wind turbine rotor blade with a rotor blade connection having a rotationally symmetrical flange coupling, the method comprising:
casting the flange coupling as a single piece from metal or producing the flange coupling as a single piece in a nodular graphite casting process, the flange coupling having a first end and a second end, wherein the first end has two arms, each of the two arms having a front surface and a plurality of bores at the first surface, the plurality of bores being configured to receive fasteners for fastening the wind turbine rotor blade to a hub of a wind turbine,
placing the flange coupling on a winding core, and
embedding the second end in a fiber-reinforced composite during a winding of a rotor blade root region of the wind turbine rotor blade, wherein the second end is oriented such that the second end extends in a direction of an axis of rotation of the flange coupling, wherein the first end of the flange coupling extends away from the wind turbine rotor blade,
wherein the flange coupling is configured to directly couple the wind turbine rotor blade to the hub of the wind turbine.

15. A method for producing a wind turbine rotor blade with a rotor blade connection having a rotationally symmetrical flange coupling, the method comprising:
casting the flange coupling as a single piece from metal or producing the flange coupling as a single piece in a nodular graphite casting process, the flange coupling having a first end and a second end, wherein the first end has two arms, wherein the flange coupling is configured to directly couple the wind turbine rotor blade to the hub of the wind turbine.

* * * * *